United States Patent [19]

Nakajima

[11] Patent Number: 4,941,926

[45] Date of Patent: Jul. 17, 1990

[54] INHIBITING POPCORN POLYMER FORMATION

[75] Inventor: Sadao Nakajima, Mie-ken, Japan

[73] Assignee: Hakuto Chemical Co., Ltd., Tokyo, Japan

[21] Appl. No.: 345,352

[22] Filed: Apr. 28, 1989

[51] Int. Cl.$^5$ ................................................ B08B 9/00
[52] U.S. Cl. ...................... 134/22.19; 585/3; 585/4; 585/5
[58] Field of Search ...................... 134/22.19; 585/3, 4, 585/5

[56] References Cited

U.S. PATENT DOCUMENTS

| | | | |
|---|---|---|---|
| 3,371,124 | 2/1968 | Albert et al. | 585/4 |
| 3,432,563 | 3/1969 | Metzler | 585/4 |
| 3,526,673 | 9/1970 | Albert | 585/5 |
| 4,556,476 | 12/1985 | Miller et al. | 585/950 |
| 4,654,451 | 3/1987 | Miller et al. | 585/5 |
| 4,863,524 | 9/1989 | Komebashiri et al. | 134/22.19 |

OTHER PUBLICATIONS

Georgieff, K. K., "Rapid Build-up of a Pyrophoric Polymer in Ethylene Plant Deethanizer and Depropanizer Columns," 62, *The Canadian Journal of Chemical Engineering*, June 1984 at 367.

*Primary Examiner*—Curtis R. Davis
*Attorney, Agent, or Firm*—Fitch, Even, Tabin & Flannery

[57] ABSTRACT

The formation of popcorn polymer on the inner surface of an olefin production apparatus is inhibited by treating the surface with a surface treating agent comprising an organic acid and/or salts thereof and at least one member selected from the group consisting of a corrosion-resistant agent, a reducing agent and a penetrant, and balance being water.

7 Claims, No Drawings

INHIBITING POPCORN POLYMER FORMATION

BACKGROUND OF THE INVENTION

Field of the Invention

This invention relates to a method for the inhibition of popcorn polymer formation by treating the inner surface of an olefin production apparatus with a popcorn polymer formation inhibitor while the operation of the apparatus is suspended and the apparatus is maintained in a state destitute of olefins for the purpose of precluding the cumulative adhesion of olefins (referring collectively to all hydrocarbons possessing at least one double bond and derivatives thereof) to the recovery system or the refining system.

Description of the Prior Art

In the production of an olefin, a so-called popcorn polymer of a porous three-dimensional structure occurs accidentally and not infrequently in the apparatus owing to the polymerization of the olefin in the step of refining and recovery or in the step of recovering the unaltered monomer after termination of the polymerization during the production of synthetic rubber. This popcorn polymer occurs both in the gaseous phase and the liquid phase. It is more likely to occur where the concentration of the monomer (olefin) is high and the temperature is high. A minute amount of oxygen (peroxide) acts as an initiator for the reaction of polymerization and starts the reaction. Iron rust, if any, accelerates the reaction of popcorn polymerization to a great extent.

Numerous monomers containing such olefins as styrene, α-methyl styrene, acrylic acid and esters thereof, vinyl acetate, acrylonitrile, acrylamide, methacrylamide, etc. and such diolefins as 1,3-butadiene, isoprene, and chloroprene, on reaching refining devices during the step of production and the step of recovery, assume certain conditions such as those related to temperature, monomer concentration, coexistence of vapor and liquid phase, humidity, trace oxygen and iron rust which are highly conducive to the occurrence of of popcorn polymerization.

The popcorn polymer is disposed to forming "seeds" which may continue to propagate until the monomer ceases to exist in much the same way as cancerous cells. Because of this nature, minute particles of the popcorn polymer so formed at all rapidly grow into large lumps of polymer. The popcorn polymer therefor adheres to and defiles the heat-exchanger, distillation tower, and piping installed within the system for refining and recovering the produced olefin and deteriorates the efficiency of the refining operation. It often clogs the apparatus and its piping. In an extreme case, the mechanical pressure generated during the propagation of the polymer may deform and fracture the apparatus.

The reason for the rapid propagation of the popcorn polymer is that, as the polymer grows, radically active sites are newly formed inside the polymer and the polymer attains growth from the newly formed radically active sites. It is a surprising fact that the (radically) active sites existing inside the polymer have a long life. When the polymer exposed to the ambient air during suspension of the operation of the apparatus is brought into contact with the monomer as a result of the resumption of the operation, it again starts growing and propagating from the active sites present therein.

The popcorn polymer is of such a quality that it is insoluble in all solvents and defies fusion by heating. For the removal of the mischievous popcorn polymer, the apparatus must be disassembled and mechanically cleaned. Temporary suspension of the apparatus and the cleaning thereof bring about an immense economic loss.

Numerous inhibitors have been proposed for the purpose of precluding the occurrence of this popcorn polymer phenomenon. Examples are nitrites, nitrogen oxides, nitroso compounds, alkyl phenols, aromatic amines, hydroxylamines, etc. For these inhibitors to be effectively used, they must be continuously injected into the apparatus during its operation. They are invariably deficient substantially in effect. Moreover, they are practically ineffective in during the propagation of popcorn polymer which has already started. Most of these conventional inhibitors are less volatile than the monomer and are ineffective in curbing in the gaseous phase the occurrence of the popcorn polymer in the system for recovery or refining of the monomer by distillation. In the case of volatile inhibitor, since it is used in a large amount, it is entrained by the finished product and consequently suffered to impair the monomer quality.

The reason for this rapid propagation of the polymer is that as the polymer grows, it newly forms radically active sites within the polymer and the polymer continues its growth from these newly formed radically active sites. Once the polymer begins to propagate, the polymer depressor is deprived of its effect.

SUMMARY OF THE INVENTION

It is an object of the invention to provide a method for the inhibition of popcorn polymer formation by treating the inner surface of an olefin production apparatus with a surface-treating agent while the operation of the apparatus is suspended and the apparatus is maintained in a state destitute of olefins for the purpose of precluding the cumulative adhesion of olefins to the recovery system or the refining system.

Other objects and advantages of the present invention may become apparent to those skilled in the art from the following description.

DESCRIPTION OF THE PREFERRED EMBODIMENT

The surface-treating agent for use in the inner surface of an olefin production apparatus is formed by using as a main component thereof at least one compound selected from the group consisting of organic acids, and salts of organic acids.

The organic acids which are similarly usable include citric acid, glycolic acid, gluconic acid, ethylene diaminetetraacetic acid (EDTA), N-hydroxylethyl ethylene diamine-N,N',N'-triacetic acid (HEDTA), diethylene triamine-N,N,N',N'',N''-pentaacetic acid (DTPA), nitrile triacetic acid (NTA), triethylenetetramine-N,N,N',N'',N''',N'''-hexaacetic acid (TTHA), and hydroxyethylimino diacetic acid (HEIDA), oxalic acid, sulfamic acid, tartaric acid, formic acid, acetic acid, thioglycolic acid, malic acid, succinic acid, benzene sulfonic acid.

Preferred salts of organic acids are sodium salts, potassium, amine and ammonium salts, for example.

The surface-treating agent of this invention is prepared in the form of an aqueous solution (including a water-soluble organic solvent) containing the agent in a concentration in the range of 10 to 50 weight parts per 100 weight parts of the surface-treating agent.

The efficiency of the surface-treating agent of this invention may be enhanced by incorporating in the agent one member or a mixture of two or more members selected from the group consisting of corrosion-resistant agent, a reducing agent, and a penetrant.

The corrosion-resistant agent in an amount of 0.5 to 5 weight parts to be incorporated in the surface-treating agent of this invention serves the purpose of preventing the surface-treating agent from corroding the inner surface of the apparatus under treatment and aiding the surface-treating agent in selectively removing the product of corrosion.

A corrosion-resistant agent fit for this purpose can be easily selected from among numerous commercially available products. Typical examples of such corrosion-resistant agents are mercaptans (aliphatic, alicyclic, aromatic, and/or heterocyclic types), alcohols possessing a triple bond (propargyl alcohol and 4-methyl pentinyl-1), and imidazoline compounds. A corrosion-resistant agent of the sort marketed under the trademark designation "IBIT" is also useful.

The reducing agent in an amount of 0.5 to 5 weight parts incorporated in the surface-treating agent of this invention serves the purpose of preventing the apparatus from succumbing to oxidation and the consequent corrosion. Typical reducing agents are hydrazine, sodium hydrogensulfide, L-ascorbic acid, hydroxylamine hydrochlorides, sodium nitrite and erythorbic acid.

The penetrant in an amount of 0.25 to 5 weight parts to be incorporated in the surface treating agent of the present invention serves the purpose of further enhancing the effect of the surface-treating agent in the course of the surface treating of the inner surface of the apparatus. As preferred examples of penetrants, such surfactants as Pluronic type and Tetronic type alkylphenol ethyleneoxide adducts which abound in penetrating power may be cited.

The surface-treatment of the inner surface of the olefin production apparatus can be easily attained by filling the inner surface of the apparatus while the apparatus is in a state of suspended operations during periodic inspection and maintenance. About 24 hours is a sufficient time for the contact of the inner surface of the apparatus with the aqueous solution driving the treatment. When necessary, the amount of surface-treating agent to be used may be decreased or the effect of treatment enhanced to shorten the time of the treatment by circulating the aqueous solution of the agent through the apparatus by means of a pump or by spraying the aqueous solution on the inner surface of the apparatus, for example. After the surface treatment is completed, the aqueous solution remaining inside the apparatus can be easily removed by transferring the aqueous solution from the apparatus to an external recovery system and washing the residual aqueous solution out of the apparatus with plain water. After the removal of the used aqueous solution, normal operation of the apparatus can be started by charging the raw material into the apparatus and setting the apparatus back into operation.

When the inhibitor of this invention is used in a concentration not reaching the prescribed level mentioned above, it brings about a discernible effect and not a sufficient effect in curbing the occurrence of the popcorn polymer. If it is used in a concentration exceeding the prescribed level, the excess is wasted and is not used to advantage.

The conditions under which the inhibitor of this invention is used are not critical. The inhibitor can be used as effectively under application or pressure as under a vacuum. It is used as effectively at elevated temperatures as at low temperatures. Though the immersion time is desired to be as long as possible, roughly 24 hours' immersion suffices for the purpose of the inhibition.

Hereinunder, the present invention will be described more specifically by way of Examples. However, the present invention is in no way restricted by these Examples.

EXAMPLE 1

An iron piece (a round bar measuring 2 mm in diameter and 38 mm in length and weighting 1.2 g) corroded in a natural environment was immersed at room temperature in an aqueous solution containing the surface-treating agent of this invention (as indicated in Table 1), washed thoroughly with purified water to remove the adhering inhibitor, and dried under a vacuum. The iron piece was placed in a pressure vessel having an inner volume of 100 ml and containing 20 g of purified 1,3-butadiene, 1 g of water, and 20 mg of benzoyl peroxide. The vessel, with the inner space displaced with $N_2$, was retained in a constant temperature bath at 60° C. for 20 days. The polymer formed on the iron piece was treated with hot toluene for removal of linear polymer. The total amount of the residual popcorn polymer was weighed. For the purpose of comparison, the same iron piece not given the treatment mentioned above was subjected to the same procedure. The results were as shown in Table 1.

TABLE 1

|  | Surface-treating agent of this invention | Amount of Popcorn polymer formed |
|---|---|---|
| Example | Ammonium citrate (5%) in water | 1.5 |
|  | Glycolic acid (5%) in water | 3.4 |
|  | Sodium glucolate (5%) in water | 3.0 |
|  | EDTA.2Na (5%) in water | 0.04 |
|  | EDTA.3Na (5%) in water | 0.8 |
|  | EDTA.4Na (5%) in water | 3.0 |
|  | HEDTA.3Na (5%) in water | 0.7 |
|  | DTPA.5Na (5%) in water | 1.6 |
|  | NTA.3Na (5%) in water | 0.8 |
|  | TTHA.6Na (5%) in water | 2.9 |
|  | HEIDA.2Na (5%) in water | 1.7 |
| Comparative Example | $NaNO_2$ (5%) in water | 9.7 |
|  | $Na_3PO_4$ (5%) in water | 9.5 |
|  | Sodium erythorbate | 11.3 |
|  | No treatment | 12.8 |

EXAMPLE 2

The procedure of Example 1 was faithfully repeated, except that 10 g of purified 1,3-butadiene and 10 g of purified styrene monomer were used in the place of 20 g of 1,3-butadiene. The results were as shown in Table 2.

TABLE 2

|  | Surface-treating agent of this invention | Amount of Popcorn polymer formed |
|---|---|---|
| Example | Ammonium citrate (5%) $NH_2$—$NH_2$ (0.2%) in water | 2.2 |
|  | EDTA.3Na (5%) erythorbic acid (0.2%) in water | 1.4 |
|  | HEDTA.3Na (5%) L-ascorbic acid (0.2%) in water | 1.0 |
|  | NTA.3Na (5%) $NaNO_2$ (0.2%) in water | 1.8 |
| Comparative | No treatment | 14.3 |

TABLE 2-continued

| Surface-treating agent of this invention | Amount of Popcorn polymer formed |
|---|---|
| tive Example | |

EXAMPLE 3

The depropanizer in an ethylene plant receives a fraction larger than $C_3$, effects distillation of the received fraction, and discharges $C_3$ fractions such as propane through the tower top and fractions larger than $C_4$ through the tower bottom. Since such olefins as 1,3-butadiene, butene, cyclopentadiene, indene, and styrene are present in high concentrations in the bottom, the boiler for supplying heat at the bottom and the pipe for discharging the bottoms are always defined with the popcorn polymer.

When the bottom part of the depropanizer, the reboiler, and the bottoms discharge pipe in the actual plant were immersed for 40 hours in an aqueous solution containing the surface-treating agent of this invention (EDTA.3Na/HEDTA.3Na/erythorbic acid/nonylphenol ethylene oxide 11 mol-adduct/IBIT No. 30 AR=10:10:0.5:0.2:0.2, weight ratio) in a concentration of 3% by weight, put to normal use for one year, and visually inspected during a periodic disassembly and maintenance, absolutely no defilement was detected where serious smearing with the popcorn polymer should be observed normally. Thus, the effectiveness of the treatment was confirmed. Particularly in the gaseous-phase regions conventionally susceptible of the defilment, substantially no smearing was detected owing to the treatment with the surface-treating agent of this invention.

What is claimed is:

1. A method for the inhibition of popcorn polymer formation in an olefin production apparatus, said method comprising treating the inner surface of the apparatus with an efficient amount of a surface-treating agent diluted with water so as to include an aqueous solution of an organic acid and/or salts thereof as a main component in a concentration of 0.5 to 10 weight percent while the operation of the olefin production apparatus is suspended and olefins are substantially removed from the apparatus, said surface-treating agent comprising:
100 weight parts of the surface-treating agent,
(a) at least one compound selected from the group consisting of citric acid, glycolic acid, gluconic acid, ethylene diamine-tetraacetic acid (EDTA), N-hydroxyethyl ethylene diamine-N,N',N'-triacetic acid (HEDTA), diethylene triamine-N,N,N',N'',N''-pentaacetic acid (DTPA), nitrile triacetic acid (NTA), triethylenetetramine-N,N,N',N'',N''',N'''-hexaacetic acid (TTHA), and hydroxyethylimino diacetic acid (HEIDA), oxalic acid, sulfamic acid, tartaric acid, formic acid, acetic acid, thioglycolic acid, malic acid, succinic acid, and benzene sulfonic acid, and salts of sodium, potassium, amine and ammonium thereof in an amount of from 10 to 50 weight parts;
and at least one member selected from the group consisting of (b) a corrosion-resistant agent, in an amount of 0.5 to 5 weight parts; (c) a reducing agent in an amount of 0.5 to 5 weight parts and (d) a penetrant in an amount of 0.25 to 5 weight parts; and balance being water.

2. A method according to claim 1, said organic acid and/or salts thereof are selected from the group consisting of citric acid, glycolic acid, gluconic acid, ethylene diamine-tetraacetic acid (EDTA), N-hydroxyethyl ethylene diamine-N,N',N'-triacetic acid (HEDTA), diethylene triamine-N,N,N',N'',N''-pentaacetic acid (DTPA), nitrile triacetic acid (NTA), triethylenetetramine-N,N,N',N'',N''',N'''-hexaacetic acid (TTHA), and hydroxyethylimino diacetic acid (HEIDA), and sodium, potassium, amine and ammonium salts thereof.

3. A method according to claim 1, said surface-treating agent consists essentially of organic acid and/or salts thereof, and a corrosion-resistant agent.

4. A method according to claim 1, said surface-treating agent consists essentially of organic acids and/or salts thereof, and a reducing agent.

5. A method according to claim 1, said surface-treating agent consists essentially of organic acids and/or salts thereof, and a penetrant.

6. A method according to claim 1, said surface-treating agent consists essentially of organic acids and/or salts thereof, and a corrosion-resistant agent and a penetrant.

7. A method according to claim 1, said surface-treating agent consists essentially of organic acids and/or salts thereof, and a reducing agent and a penetrant.

* * * * *